United States Patent [19]

Riccitelli

[11] Patent Number: 5,282,373
[45] Date of Patent: Feb. 1, 1994

[54] ANTITHEFT PEDAL-LOCKING DEVICE FOR VEHICLES, PARTICULARLY SUITABLE FOR VEHICLES WITH AUTOMATIC TRANSMISSION

[76] Inventor: Guglielmo Riccitelli, No. 3, Via Capo Passero, 00122 Ostia Lido - Roma, Italy

[21] Appl. No.: 659,282
[22] PCT Filed: Nov. 9, 1989
[86] PCT No.: PCT/IT89/00073
§ 371 Date: Apr. 1, 1991
§ 102(e) Date: Apr. 1, 1991
[87] PCT Pub. No.: WO90/05653
PCT Pub. Date: May 31, 1990

[30] Foreign Application Priority Data
Nov. 15, 1988 [IT] Italy .................. 48560 A/88

[51] Int. Cl.$^5$ ................................ B60R 25/00
[52] U.S. Cl. ...................... 70/199; 70/202; 70/238
[58] Field of Search ............ 70/198–202, 70/238, 211, 212, 203, 204

[56] References Cited

U.S. PATENT DOCUMENTS

| | | | |
|---|---|---|---|
| 1,676,623 | 7/1928 | Turner | 70/199 |
| 4,076,095 | 2/1978 | Adamski | 70/199 |
| 4,700,555 | 10/1987 | Robertson, Sr. et al. | 70/203 |
| 5,094,092 | 3/1992 | Hsieh | 70/199 |

FOREIGN PATENT DOCUMENTS

| | | |
|---|---|---|
| 0085257 | 8/1983 | European Pat. Off. |
| 2543084 | 9/1984 | France |
| 2023520 | 1/1980 | United Kingdom .............. 70/203 |
| 2043005 | 10/1980 | United Kingdom |
| 2091656 | 8/1982 | United Kingdom |
| 2107661 | 5/1983 | United Kingdom |

*Primary Examiner*—Peter M. Cuomo
*Assistant Examiner*—Darnell M. Boucher
*Attorney, Agent, or Firm*—Roylance, Abrams, Berdo & Goodman

[57] ABSTRACT

An antitheft pedal-locking device has a first supporting member extending upwardly, a safety lock coupled to the first supporting member and a shaped member projecting laterally adjacent a lower end of the first supporting member. A second supporting member is slidably coupled to the first supporting member for movement of the first supporting member between a lower locking position and an upper unlocking position. The second supporting member has a projecting member cooperating with the shaped member in the locking position of the first support member for locking a vehicle pedal between them. A base member for resting on a vehicle floor is adjustably connected by a first coupling to a lower end of the second supporting member. A third supporting member is adjustably mounted on the base member by a second coupling. The third supporting member is laterally spaced from and is parallel to the second supporting member. An obstruction member is mounted on the third supporting member for obstructing motion of a second vehicle pedal.

12 Claims, 2 Drawing Sheets

ANTITHEFT PEDAL-LOCKING DEVICE FOR VEHICLES, PARTICULARLY SUITABLE FOR VEHICLES WITH AUTOMATIC TRANSMISSION

This invention relates to an antitheft pedal-locking device for vehicles, which is particularly suitable for automatic transmission vehicles.

More particularly, this invention relates to a device of the type mentioned above which allows the operation of at least one pedal to be safely locked.

The study and the realization carried out in the recent years of mechanical type antitheft devices for motor vehicles have resulted in the commercial availability of different types of antitheft devices, which are affected however by a number of drawbacks of a general type or more specifically as regards their employment in automatic transmission motor vehicles.

More particularly, reference is made herein to a first kind of realization, which provides the mechanical locking of pedals, particularly the brake and the clutch pedals, said realization consisting of two independent or articulated shoes, which lock said pedals by means of a safety lock that is usually arranged near said shoes.

The major problem stemming from such kind of device is that connected with the fact that the driver has to reach out quite uncomfortably his hands for the pedal area in order to operate the locking device.

More recently, some devices have been suggested which are made of a long rod consisting of an anti-picking material and which is provided at both ends with two shaped members that couple respectively with a pedal and with the steering wheel of the vehicle.

The coupling with the steering wheel is obviously locked by means of a safety lock that prevents the same from being disengaged.

This device, which owing to its characteristics can be indifferently employed on traditional transmission cars as well as on automatic transmission vehicles is affected in the main by two drawbacks.

The first one is that in connection with its longitudinal size, and as a consequence with the cumbersomeness of such device when it is not employed, while the second drawback, which is perhaps the most relevant, is that in connection with the poor safety against theft.

Indeed, it is sufficient to cut the rim of the wheel by means of a saw or the like, as said rim is usually not a valid obstacle for thieves, and then to disengage the antitheft device by merely pulling apart the two ends of the rim so cut.

The Applicant himself has invented and realized an antitheft device which is the object of the Italian patent No. 1,149,007, which obviates all drawbacks mentioned above as it is so realized as to allow the pedals to be locked by the driver in the driving position and without interacting with the steering wheel.

However, such device is not fit for automatic transmission cars because of its structural characteristics, and it provides anyway the locking of two pedals which are not spaced too much from one another.

Indeed, it is well known that cars with automatic transmission lack the clutch pedal, and in addition the brake and the gas pedals are spaced from one another much more than said pedals are in the case of traditional vehicles.

In GB patent application No. 2,091,656 it is described an antitheft pedal-locking device for vehicles comprising a first supporting member extending upwards and provided with a safety lock and with a laterally projecting member, a second supporting member, upon which the first supporting member slides, with a projecting member cooperating with the corresponding member of the first supporting member so as to lock a pedal of the vehicle when the latter member is in its lower position, while the lower end of the second supporting member may carry a base member to rest on the floor of the vehicle.

In the light of what has been mentioned above, the Applicant has intended to realize an extremely simple antitheft device which can be employed indifferently both on traditional and on automatic transmission cars, said device providing the locking of at least one pedal (the brake pedal in the case of automatic transmission cars, and the clutch pedal in the case of traditional transmission cars) and, possibly, the impediment of the motion of a second pedal (the gas pedal in the case of automatic transmission cars, and the brake pedal in the case of traditional transmission cars).

Accordingly, it is a specific object of the present invention an antitheft pedal-locking device for motor vehicles, said device comprising a first support that extends upwards, and is provided with a safety-lock and, at the point corresponding to its lower end, with a shaped member projecting laterally so as to create a seat for locking a pedal of the motor vehicle; a second support on which said first support slides between a locking position and an unlocking position, said support being provided with a projecting member of such shape and sizes as to realize, together with said shaped member, when the first support is in the locking position, the lower locking of the locking seat of the pedal; and a base member to which the lower end of the second support is coupled for realizing the support of the device on the floor of the vehicle, in which the coupling between the base member and said second support can be realized through a sleeve which is arranged on said base member, the lower end of said second support sliding inside said sleeve, said sliding being realized through mechanical means, as for instance through a screw-nut screw coupling, which is obtained inside said second support, so that the possibility is realized of adjusting by acting from the outside part by means of a socket head screw, or by a screw driver or the like, the height of said projecting member, and hence of the whole locking device, with respect to the floor of the vehicle, in which two projecting parts which are arranged laterally on the respective angles are provided inside the locking seat, on the inner upper wall created by the shaped member of the first support, and on the inner lower wall created by the projecting member of the second support, and in which said shaped member does not interfere with the projecting member during the reciprocal sliding of the two supporting members. Said second support can be so realized as to have at the point corresponding to the projecting member, at a position below the locking position of the first support, i.e. at the lowest position that it can reach in its sliding along the second support, a change in its angular position.

Again according to the present invention, a third support can be provided on said base member, said support being laterally spaced and in the parallel position, and bearing a member capable of obstructing the motion of a second pedal.

The coupling between said third support and said obstruction member can be of the fixed or of the oscillating type so that there is the possibility of rising the obstruction member when the device is not employed, so as to limit the space occupied by the device itself. the device on the floor of the vehicle.

Said second support can be so realized as to have at the point corresponding to the projecting member, at a position below the locking position of the first support, i.e. at the lowest position that it can reach in its sliding along the second support, a change in its angular position.

The coupling between the base member and said second support can be realized through a sleeve, which is arranged on said base member, the lower end of said second support sliding inside said sleeve, said sliding being realized through mechanical means, as for instance through a screw-nut screw coupling, which is obtained inside said second support, so that the possibility is realized of adjusting by acting from the outside part by means of a socket head screw, or by a screw driver or the like, the height of said projecting member, and wherein.

Figure 1:
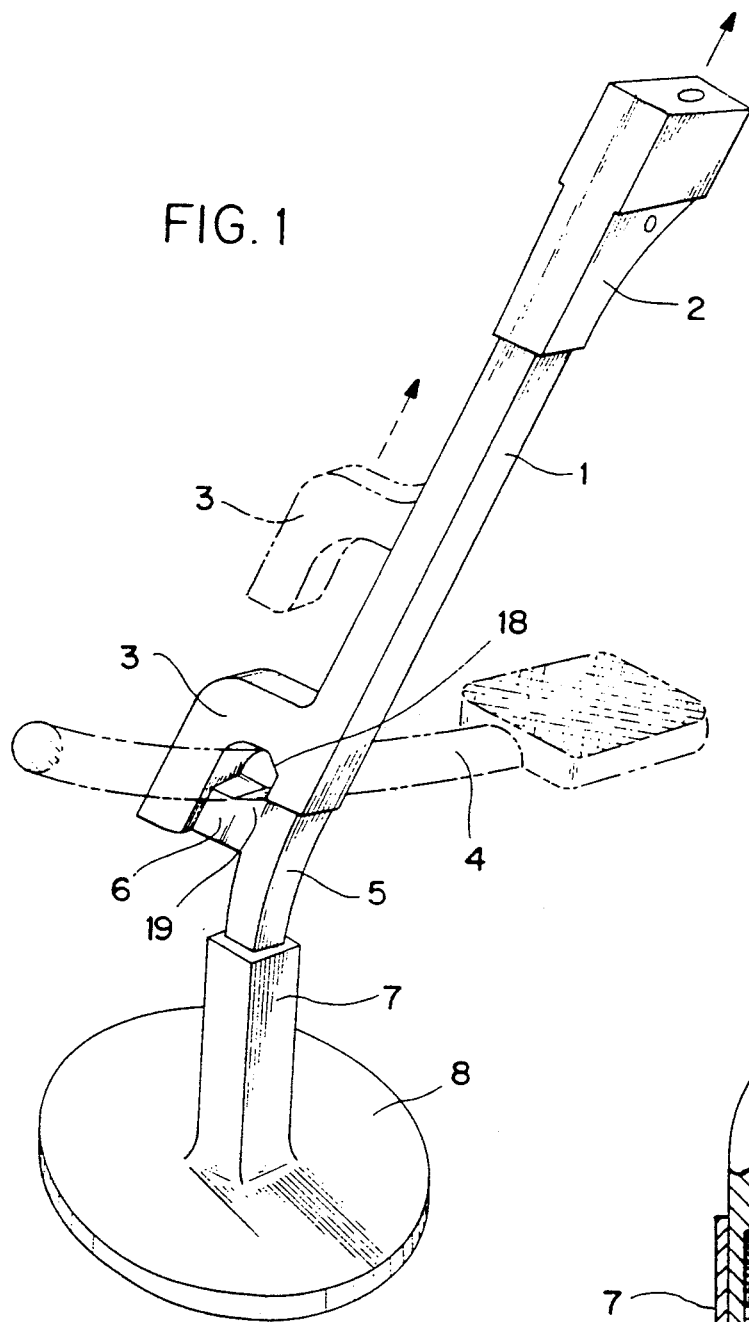
FIG. 1 is a perspective view of a first kind of embodiment of the device according to the present invention.
Figure 2:
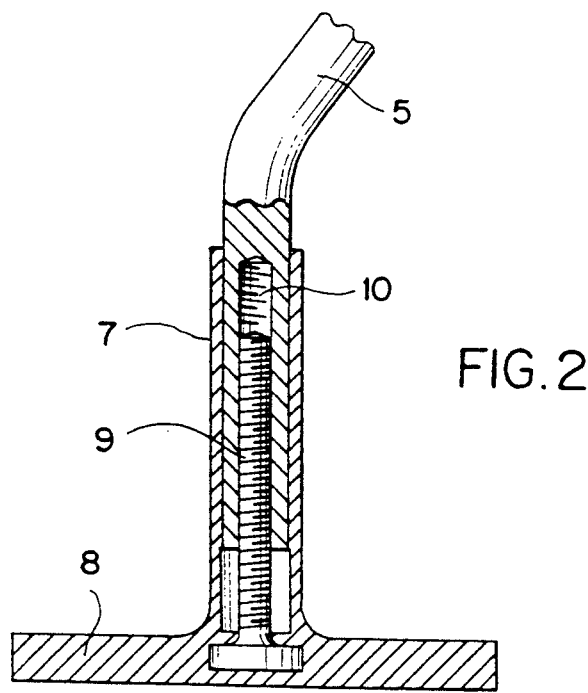
FIG. 2 is a vertical cross-sectional view of a detail of the device shown in FIG. 1.

The device illustrated in FIG. 1 and in FIG. 2 comprises a supporting member 1 whose upper end is provided with a safety lock 2 and whose lower end is provided with a shaped member 3 for locking the pedal 4.

Said supporting member 1 is slidably assembled on a second supporting member 5 which is provided with a projecting side member 6.

The position of said side projecting member 6 on said supporting member 5 is such that it coincides with the open position of the shaped member 3 when the supporting member 1 is in its lowest sliding position along the supporting member 5, so that a complete locking of said pedal 4 is obtained.

The supporting member 5 is coupled at the end which is opposite to the coupling end with the supporting member 1, to the sleeve 7 of a supporting base 8 of the device on the floor of the vehicle. Obviously the shape of said supporting base can be modified according to the specific requirements.

The coupling between the supporting member 5 and the sleeve 7 of the base member 8 is obtained through the interposition of a coupling by means of the screw 9 and the coupled nut screw 10 so that the distance of the member 6 from the floor of the vehicle can be adjusted by means of a socket head screw or the like, according to the kind of the motor car and to the position of the pedal.

The slope of the supporting member 5 is changed (see FIG. 2) at the point corresponding to the member 6, such change in the slope allowing the device according to present invention to be positioned in a better way.

The two strikers 18 and 19 which are provided respectively on the shaped member 3 and on the projecting member 6 allow the device according to the present invention to be adapted to any kind of pedal 15.

As illustrated in the following, the supporting member 5 can also be realized without any change in its slope.

A device like that disclosed and illustrated in FIGS. 1 and 2 can be indifferently employed both on motor vehicles with the traditional speed gear or transmission by locking the clutch pedal, and on automatic transmission vehicles, by locking the brake pedal.

For employing the device of this invention, it is sufficient to arrange the supporting member 1 in the unlocking position, i.e. in the position of maximum sliding extent upwards with respect to the supporting member 5 (the position of the member 3 which is shown in dashed lines in FIG. 1), then to arrange the device in the position with the member 6 below the bar of the pedal 4 and then to cause the supporting member 1 to slide by pushing it along the supporting member 5 until the members 3 and 6 cause the locking of said pedal 4 to be realized.

The shaped member 3 can be provided with a bevelled part at the point corresponding to an upper edge, in the inner part of the housing that is formed by said member, so that also pedals whose bars do not adapt perfectly to the housing so formed can be locked.

For the unlocking operation, it is sufficient to act on the key of the safety lock 2 and then to pull the supporting member 1 upwards.

Figure 3:
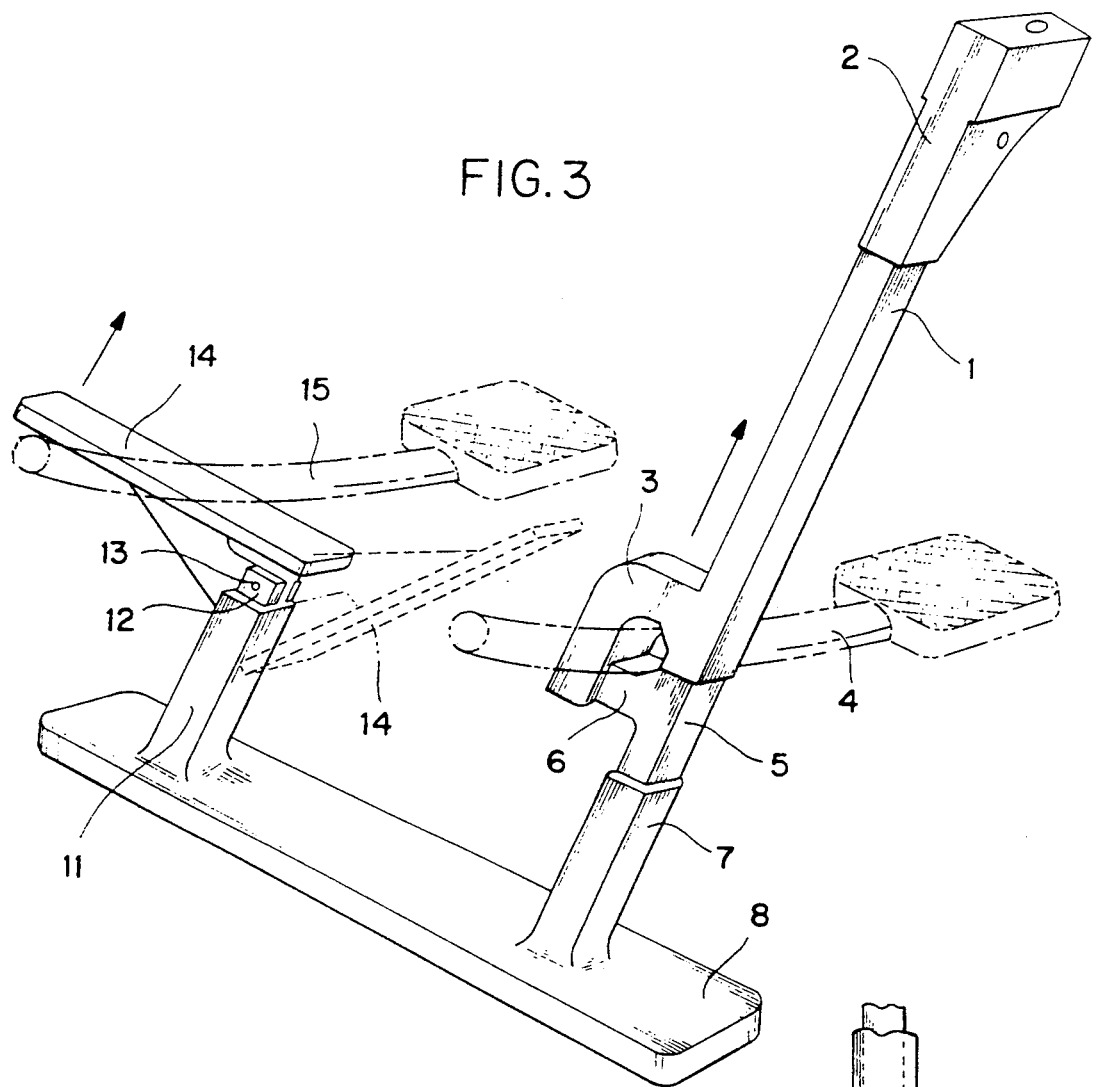
FIG. 3 is a perspective view of a second kind of embodiment of the device according to the present invention.

The device illustrated in FIG. 3, whose members that correspond to those of the device shown in FIG. 1 are pointed out by the same reference numerals, has a straight line support 5.

A second sleeve 11 is provided on the base member 8, in which sleeve a supporting member 12 is slidably arranged. A member 14 for obstructing said pedal 15 is coupled to said supporting member 12 is that the obstruction member can oscillate about the pivot 13.

The member 14 can be folded upwards when the device is not in use, so that the space occupied by the device itself can be reduced.

The position of the member 14 can also be adjusted by causing the supporting member 12 to slide along the sleeve 11 by means of a mechanical device (not shown) which is similar to that disclosed above.

In order to use this device, it is sufficient to insert laterally the device itself, after taking the supporting member 1 into the unlocking position, so that the member 14 is taken below the pedal 15, while the member 6 is taken below the pedal 4, and then to cause the supporting member 1 to slide along the supporting member 5 till locking is obtained.

Figure 4:
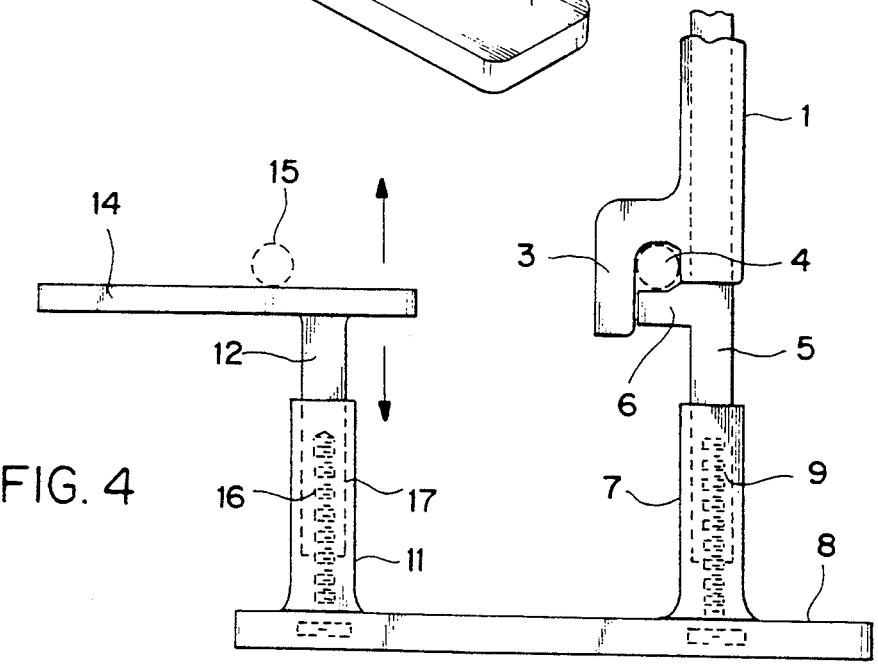
FIG. 4 is a front view of a third kind of embodiment of the device according to the present invention.

This kind of device, just like that shown in FIG. 4, can be advantageously employed on motor cars having automatic transmission to lock the brake pedal (pedal 4) and obstruct the gas pedal (pedal 15), or on traditional transmission vehicles to lock the clutch pedal (pedal 4) and to obstruct the brake pedal (pedal 15).

The member 14 can also be so shaped as to act as an obstruction to the motion of the pedal 15 both in front of it and on the back of the same.

The device shown in FIG. 4 has the same features as that shown in FIG. 3, except as regards the coupling between the member 14 and the supporting member 12 which in that case is of the rigid type.

FIG. 4 shows the screw 16-nut screw 17 coupling for adjusting the position of the member 14.

This invention has been disclosed with specific reference to some preferred embodiments of the same, but it is to be understood that modifications and/or changes can be introduced by those who are skilled in the art without departing from the spirit and scope of the invention for which a priority right is claimed.

I claim:

1. An antitheft pedal locking device, comprising:
a first supporting member extending upwardly;
a safety lock coupled to said first supporting member;
a shaped member projecting laterally adjacent a lower end of said first supporting member;
a second supporting member slidably coupled to said first supporting member for movement of said first supporting member between a lower locking position an upper unlocking position, said second supporting member having a projecting member cooperating with said shaped member in said locking position of said first supporting member for locking a vehicle pedal;
a base member for resting on a vehicle floor adjustably connected by first coupling means to a lower end of said second supporting member; and
a third supporting member adjustably mounted on said base member by second coupling means, said third supporting member being laterally spaced from and parallel to said second supporting member and mounting an obstruction member for obstructing motion of a second vehicle pedal, said obstruction member including a single, pivotally mounted, transverse member positionable on a rear side of the second vehicle pedal.

2. An antitheft pedal locking device according to claim 1, wherein
said first coupling means comprises a sleeve on said base member slidably receiving said lower end of said second supporting member, and mechanical means, activated exteriorly of said sleeve, for sliding said second supporting member relative to said base member.

3. An antitheft pedal locking device according to claim 2 wherein
said mechanical means of said first coupling means comprises mating screw means and nut means inside said second supporting member, said screw means being adjustable from outside said second supporting member.

4. An antitheft pedal locking device according to claim 1 wherein
said second coupling means comprises a sleeve on said base member slidably receiving said third supporting member, and mechanical means, adjustable exteriorly of said sleeve, for sliding said third supporting member relative to said base member.

5. An antitheft pedal locking device according to claim 4 wherein
said mechanical means of said second coupling means comprises mating screw means and nut means inside said third supporting member, said screw means being adjustable from outside said third supporting member.

6. An antitheft pedal locking device, comprising:
a first supporting member extending upwardly;
a safety lock coupled to said first supporting member;
a shaped member projecting laterally adjacent a lower end of said first supporting member and forming an upper vehicle pedal locking seat;
a second supporting member slidably coupled to said first supporting member for movement of said first supporting member between a lower locking position and an upper unlocking position, said second supporting member having a projecting member cooperating with said shaped member in said locking position of said first supporting member and forming a lower vehicle pedal seat;
a base member for resting on a vehicle floor connected by first coupling means to a lower end of said second supporting member, said first coupling means including a sleeve on said base member slidably receiving said lower end of said second supporting member and mechanical means, activated exteriorly of said sleeve of said first coupling means, for sliding said second supporting member relative to said base member;
sloping strikers on inner corners of said locking seats; and
a third supporting member mounted on said base member by second coupling means, said third supporting member being laterally spaced from and parallel to said second supporting member and pivotally mounting an obstruction member for obstructing motion of a second vehicle pedal, said second coupling means including a sleeve on said base member slidably receiving said third supporting member, and mechanical means, adjustable exteriorly of said sleeve of said second coupling means, for sliding said third supporting member relative to said base member.

7. An antitheft pedal locking device according to claim 6 wherein
said second supporting member comprises an angular bend adjacent said projecting member and below the lower locking position of said first supporting member.

8. An antitheft pedal locking device according to claim 6 wherein
said mechanical means of said first coupling means comprises mating screw means and nut means inside said second supporting member, said screw means being adjustable from outside said second supporting member.

9. An antitheft pedal locking device according to claim 6 wherein
said mechanical means of said second coupling means comprises mating screw means and nut means inside said third supporting member, said screw means being adjustable from outside said third supporting member.

10. An antitheft pedal locking device according to claim 6 wherein
said obstruction member comprises a single transverse member positionable on a rear side of the second vehicle pedal.

11. An antitheft pedal locking device according to claim 6 wherein
said obstruction member comprises two transverse members arranged according to a U lying on a side thereof, said transverse members being arrangable respectively on a rear part and in front of the second vehicle pedal.

12. An antitheft pedal locking device according to claim 6 wherein
said shaped member is bevelled on an upper edge of said upper vehicle pedal locking seat at a point corresponding to said upper seat itself.

* * * * *